US008386109B2

(12) United States Patent
Nicholls

(10) Patent No.: US 8,386,109 B2
(45) Date of Patent: Feb. 26, 2013

(54) HYBRID ELECTRIC VEHICLE AND METHOD OF CONTROL

(75) Inventor: Stephen Nicholls, Long Hanborough (GB)

(73) Assignee: Jaguar Cars Limited, Coventry (GB)

( * ) Notice: Subject to any disclaimer, the term of this patent is extended or adjusted under 35 U.S.C. 154(b) by 0 days.

(21) Appl. No.: 13/309,884

(22) Filed: Dec. 2, 2011

(65) Prior Publication Data

US 2012/0158230 A1 Jun. 21, 2012

(30) Foreign Application Priority Data

Dec. 2, 2010 (GB) .................................. 1020446.9

(51) Int. Cl.
*B60L 9/00* (2006.01)
(52) U.S. Cl. ............ 701/22; 701/101; 701/103; 701/54; 701/69; 701/86; 60/274; 60/284; 180/65.21; 180/65.245
(58) Field of Classification Search .................... 701/36, 701/48, 51, 54, 59, 69, 81, 84, 86, 88, 89, 701/100, 101, 103, 104, 112, 123, 1, 21, 701/19, 22; 180/65.21, 65.245; 318/432; 60/274, 284
See application file for complete search history.

(56) References Cited

U.S. PATENT DOCUMENTS

| | | | |
|---|---|---|---|
| 5,788,597 A | 8/1998 | Boll et al. | |
| 2006/0100057 A1* | 5/2006 | Severinsky et al. | 477/4 |
| 2008/0105477 A1* | 5/2008 | Abe | 180/65.2 |
| 2009/0048063 A1* | 2/2009 | Silveri et al. | 477/3 |
| 2009/0120699 A1* | 5/2009 | Suzuki et al. | 180/65.265 |
| 2009/0143188 A1* | 6/2009 | Soliman et al. | 477/5 |
| 2010/0300781 A1* | 12/2010 | Leone | 180/65.29 |
| 2011/0031937 A1 | 2/2011 | Bito | |
| 2011/0190971 A1* | 8/2011 | Severinsky et al. | 701/22 |
| 2012/0029751 A1* | 2/2012 | Andri | 701/22 |

FOREIGN PATENT DOCUMENTS

| | | |
|---|---|---|
| GB | 2355241 A | 4/2001 |
| JP | 2007022527 A | 2/2007 |
| JP | 2008049868 A | 3/2008 |
| JP | 2010064679 A | 3/2010 |

OTHER PUBLICATIONS

Search Report under Section 17 for Application No. GB1020446.9 dated Jun. 23, 2011.
European Search Report for Application No. EP 11 19 1682 dated Mar. 15, 2012.

* cited by examiner

*Primary Examiner* — Tuan C. To
*Assistant Examiner* — Jelani Smith
(74) *Attorney, Agent, or Firm* — Carlson, Gaskey & Olds PC

(57) ABSTRACT

An apparatus includes a fuel burning actuator operable to burn fuel to drive generator means to generate charge to recharge an energy storage means. The apparatus is operable to motor the fuel burning actuator by means of motoring means comprising an electric machine, the fuel burning actuator being operable to pump gas when motored. Brake means comprising a second electric machine is operable to generate charge in a regenerative braking operation in order to recharge the energy storage device. The apparatus is operable automatically to motor the fuel burning actuator by means of the motoring means when the fuel burning actuator is not burning fuel responsive to at least one operating parameter associated with the energy storage means, the apparatus being operable automatically to restrict by means of restrictor means an amount of gas pumped by the fuel burning actuator thereby to increase an amount of work done by the motoring means when the fuel burning actuator is motored.

12 Claims, 2 Drawing Sheets

HYBRID ELECTRIC VEHICLE AND METHOD OF CONTROL

CROSS-REFERENCE

This application claims priority from UK patent application no. GB 1020446.9 filed 2 Dec. 2010, the entire contents of which are expressly incorporated herein by reference.

FIELD OF THE INVENTION

The present invention relates to hybrid electric vehicles (HEVs). In particular but not exclusively the invention relates to HEVs operable to work in a series mode and to a method of operation of an HEV in the series mode. Aspects of the invention relate to an apparatus, to a vehicle and to a method.

BACKGROUND

It is known to provide a hybrid electric vehicle (HEV) configured for operation in a series mode in which an internal combustion engine is employed to drive an electrical generator for charging a battery and powering an electric motor. The series arrangement has the advantage that the engine may be operated at a substantially constant speed, allowing an improvement in efficiency of power generation by the engine. The speed may be selected to be a speed corresponding to that at which maximum operating efficiency of the engine is obtained.

It is an aim of the present invention to provide an improved HEV and an improved method of operating a HEV. Embodiments of the invention may provide an apparatus in which energy recovered during braking of the vehicle is used by the generator, operating as a motor, to maintain rotation of the internal combustion engine and thereby improve regenerative braking capability. Other aims and advantages of the invention will become apparent from the following description, claims and drawings.

STATEMENT OF THE INVENTION

Aspects of the invention therefore provide an apparatus, a method, a vehicle, a vessel and a locomotive as claimed in the appended claims.

According to another aspect of the invention for which protection is sought there is provided a fuel burning actuator operable to burn fuel to drive generator means to generate charge to recharge an energy storage means, the apparatus being operable to motor the fuel burning actuator by means of motoring means, the motoring means comprising a first electric machine, the fuel burning actuator being operable to pump a fluid when motored, the apparatus further comprising brake means comprising a second electric machine operable to generate charge in a regenerative braking operation in order to recharge the energy storage device, wherein the apparatus is operable automatically to motor the fuel burning actuator by means of the motoring means when the fuel burning actuator is not burning fuel responsive to at least one operating parameter associated with the energy storage means, the apparatus being operable automatically to restrict by means of restrictor means an amount of fluid pumped by the fuel burning actuator thereby to increase an amount of work done by the motoring means when the fuel burning actuator is motored.

Embodiments of the invention have the advantage that excess energy generated in a regenerative braking operation may be dissipated by the fuel burning actuator.

It is to be understood that in some circumstances the energy storage means may be unable to receive a full amount of electrical charge generated in a regenerative braking operation, resulting in a reduction in the amount of braking torque that may be developed in a regenerative braking operation and a requirement to supplement regenerative braking by alternative braking means.

The feature that the fuel burning actuator may be motored allows a regenerative braking system of the apparatus to operate independently of an operational state of the energy storage means. This feature allows the apparatus to be operated in a manner that provides a user with a consistent experience in respect of the amount of regenerative braking employed regardless of the operational state of the energy storage means. Thus if the energy storage means is unable to receive an amount of charge generated during a regenerative braking operation excess charge may be dissipated by motoring the fuel burning actuator.

It is to be understood that the energy storage means may be unable to receive a full amount of charge generated during regenerative braking due for example to a relatively high state of charge thereof or because the energy storage means has been de-rated. The energy storage means may be de-rated for example following a charge or discharge operation in which the energy storage means receives or discharges a relatively large amount of power. The energy storage means may also be de-rated if its temperature is below a prescribed value or if its temperature rises above a prescribed value. Other effects may also result in de-rating of the energy storage means.

Embodiments of the invention have the advantage that an amount of energy that may be dissipated by motoring the fuel burning actuator may be increased by restricting a flow of gas through the fuel burning actuator. The fuel burning actuator may for example be an internal combustion engine or a turbine engine that pumps gas by drawing in intake gas(es) and exhausting combustion gases.

It is to be understood that in some applications such as hybrid electric motor vehicle applications it is desirable to reduce a weight of the fuel burning actuator in order to increase a range of the vehicle when operating in electric vehicle (EV) mode. An amount of work required to motor a fuel burning actuator typically decreases as the size of the actuator is reduced. Thus the amount of work required to motor fuel burning actuators used in hybrid vehicles is likely to decrease in the future.

Embodiments of the present invention allow a surprising increase in the amount of work required to motor a given fuel burning actuator by restricting a flow of gas therethrough. Thus a relatively large amount of electrical energy may be dissipated in the fuel burning actuator. It is to be understood that a problem of dissipation of heat generated when the fuel burning actuator is motored may be readily overcome by virtue of the heat dissipation technologies typically already employed by the actuator to remove heat generated during combustion of fuel, such as a water cooling jacket or air cooling arrangement. Thus the fuel burning actuator provides an excellent means for dissipating or dumping substantial amounts of regenerated electrical energy.

In an apparatus according to some embodiments of the invention an electric machine arranged to be operated as an electrical generator driven by the fuel burning actuator may also be operated as a motor to motor the fuel burning actuator. Generators coupled to fuel burning actuators of a motor vehicle are typically arranged to generate substantial amounts of electrical power (for example 20 kW or more). When operated as a motor the electric machine may be operable at a similar power rating to that at which it may be operated as a generator. Accordingly, relatively large amounts of energy may be dissipated by the electric machine when operating as a motor without a requirement to increase a power rating of the electric machine.

It is to be understood that in some applications the fuel burning actuator and generator means driven thereby may constitute an auxiliary power unit (APU). The APU may be an APU of any suitable equipment such as a motor vehicle, a marine vessel such as a ship or submarine, a locomotive such as a railway engine, an aircraft or any other suitable equipment. The APU may be arranged to provide extended range to the equipment, such that a distance the equipment may travel may be greater than that in a case where recharging of the energy storage means by the APU were not possible.

Advantageously the apparatus may be operable automatically to restrict the amount of gas pumped by the fuel burning actuator by restricting an amount of intake gas flowing into the fuel burning actuator.

The apparatus may be operable automatically to restrict the amount of gas pumped by the fuel burning actuator by restricting an amount of gas flowing out from the fuel burning actuator.

Advantageously the restrictor means may comprise valve means.

Advantageously the apparatus may be operable to control the restrictor means to increase an amount of work done by the motoring means when the fuel burning actuator is motored by an amount responsive to the value of at least one operating parameter associated with the energy storage means.

The at least one operating parameter of the energy storage means may be selected from amongst a state of charge thereof, a temperature thereof and a present value of a maximum allowable charge rate thereof.

In some embodiments, if the energy storage means is able to receive a relatively large amount of power the apparatus may be arranged not to restrict a flow of gas through the fuel burning actuator when a regenerative braking operation takes place. However if the energy storage means is able to receive only a relatively small amount of power the apparatus may be arranged to restrict the flow of gas through the fuel burning actuator to increase the amount of work done when the fuel burning actuator is motored.

In some embodiments, the apparatus may be arranged to restrict an amount by which a flow of gas through the fuel burning actuator is restricted in inverse proportion to an amount of power that the energy storage means is able to receive. Thus if the fuel burning actuator is able to receive a relatively large amount of power the apparatus may be arranged to restrict the flow of gas through the fuel burning actuator to a lesser extent than in the case that the energy storage means is able to receive a relatively small amount of power.

The first electric machine may be operable as a generator to provide the generator means driven by the fuel burning actuator and as a motor to provide the motoring means for motoring the fuel burning actuator.

Optionally the first electrical generation means and the first electric motor means are provided by one selected from amongst a crank-integrated starter-generator (CISG) and a belt-integrated starter-generator (BISG) of an engine.

Advantageously the second electric machine may also be operable as a traction motor.

Advantageously the fuel burning actuator may comprise one selected from amongst an internal combustion engine and a gas turbine engine.

The apparatus may be operable to terminate a flow of fuel to the fuel burning actuator when the motoring means is motoring the engine during a regenerative braking operation.

According to another aspect of the invention for which protection is sought there is provided a hybrid electric motor vehicle comprising an apparatus according to the preceding aspect.

The vehicle may be a series-type hybrid vehicle in which the fuel burning actuator does not provide motive traction or a parallel-type hybrid vehicle in which the fuel burning actuator is arranged to provide traction when required. Embodiments of the invention are also useful in vehicles operable in a series or parallel hybrid mode. Embodiments of the invention are also useful in other vehicles.

According to another aspect of the invention for which protection is sought there is provided a hybrid electric locomotive comprising an apparatus according to a preceding aspect.

According to another aspect of the invention for which protection is sought there is provided a marine vessel comprising an apparatus according to a preceding aspect.

According to another aspect of the invention for which protection is sought there is provided a method comprising: generating charge to recharge an energy storage means by means of generator means driven by a fuel burning actuator; performing a regenerative braking operation in which an electric machine of brake means is controlled to generate charge to recharge the energy storage means; when a regenerative braking operation is performed, automatically motoring the fuel burning actuator by means of motoring means responsive to at least one operating parameter associated with the energy storage means, whereby the method further comprises restricting automatically by means of restrictor means an amount of gas pumped by the fuel burning actuator when the fuel burning actuator is motored thereby to increase an amount of work done by the motoring means when the fuel burning actuator is motored.

According to another aspect of the invention for which protection is sought, there is provided a hybrid electric vehicle comprising a first actuator having a rotary output shaft; a first electrical generation means for generating electrical energy, the first electrical generation means being arranged to be driven by the rotary output shaft of the first actuator; an energy storage device for storing electrical energy generated by the first electrical generation means; first electric motor means operable to rotate a rotary input shaft of the first actuator by means of electrical energy stored in the energy storage means; second electric motor means for driving at least one wheel of the vehicle using energy stored in the energy storage device; and second electrical generation means for generating electrical energy from rotation of the at least one wheel when it is required to reduce a speed of rotation of the at least one wheel thereby to enable a regenerative braking operation to be performed, the vehicle being arranged to store the electrical energy generated by the second electrical generation means in the energy storage device, wherein the vehicle is configured to rotate the input shaft of the first actuator by means of the first electric motor means when an amount of energy stored in the energy storage means exceeds a prescribed value and a regenerative braking operation is being performed.

It is to be understood that the generation of electrical energy by the second electrical generation means to reduce the speed of the vehicle is known as regenerative braking since electrical energy is generated in the braking process.

Embodiments of the invention have the advantage that an amount of charge that an energy storage device of the vehicle (such as a battery) is required to store during a regenerative braking event when the state of charge (SoC) of the energy storage device exceeds a prescribed value is reduced. This is because excess charge generated by the regenerative braking process is used to cause (or maintain) rotation of the primary actuator.

This in turn has the advantage that if the primary actuator (for example an internal combustion engine) is spinning when the regenerative braking operation is begun, and a supply of fuel to the primary actuator is momentarily stopped in response to the regenerative braking operation, the primary actuator continues to spin during the regenerative braking operation. This advantageously improves fuel efficiency of the vehicle since fuel supply to the primary actuator can be shut off during braking without causing stoppage of the primary actuator.

In addition, if it is subsequently required to use the primary actuator immediately following the regenerative braking operation it is not necessary to 'spin up' the actuator from rest, reducing a response time of the first actuator, being an elapsed time between the moment power is requested from the actuator and the moment power is delivered by the actuator.

The first electrical generation means and the first electric motor means may be provided by a single electric machine in the form of an electric motor/generator.

Alternatively the first electrical generation means and the first electric motor means may be provided by different respective electric machines.

The rotary output shaft of the first actuator and the rotary input shaft of the first actuator may be the same shaft.

The first actuator may comprise a fuel burning engine.

The fuel burning engine may comprise one selected from amongst an internal combustion engine and a gas turbine engine.

The vehicle may be arranged to terminate a flow of fuel to the engine when the first electric motor means is rotating the engine during a regenerative braking operation.

This has the advantage that an amount of fuel consumed by the vehicle during a regenerative braking event may be reduced.

The vehicle may be arranged to close a gas intake of the engine when the first electric motor is rotating the engine during the regenerative braking operation This has the advantage that a resistance of the engine to rotation by the first electric motor means may be increased. This is because the engine is acting to pump gases upstream of a gas flow path through the engine and a greater amount of torque will typically be required to rotate the engine when the gas flow upstream of the engine is restricted. The fact that the resistance of the engine to rotation is increased has the advantage that a greater amount of electrical power is required to turn the motor thereby allowing more electrical current generated in the course of the regenerative braking operation to be consumed or 'dumped'.

The fuel burning engine may comprise an internal combustion engine and the vehicle may be arranged to close an exhaust conduit of the engine when the engine first electric motor is rotating the engine during the regenerative braking operation.

This feature also has the advantage that a resistance of the engine to rotation by the first electric motor means may be increased. This is because the engine is acting to compress gas downstream of the gas flow through the engine to a greater pressure than if the exhaust conduit is fully open and therefore a greater amount of torque will typically be required to rotate the engine to compress gas being exhausted from the engine. A corresponding increase occurs in the amount of current required to turn the engine thereby allowing more electrical current generated in the course of the regenerative braking operation to be dumped.

According to another aspect of the invention for which protection is sought, there is provided a hybrid vehicle comprising a prime mover, a first electrical machine coupled to an input/output shaft of the prime mover, a battery for storing electrical charge generated by the first electrical machine, a second electrical machine coupled to an input/output shaft of a transmission unit and control means for controlling the prime mover and the first and second electrical machines, wherein during acceleration of the vehicle, the control means is arranged to operate the first electrical machine as an electrical generator, driven by the prime mover, for supplying an electrical current to the battery and to operate the second electrical machine as an electric motor for driving the transmission unit using current supplied by the battery, and wherein during braking of the vehicle, the control means is arranged to control the first electrical machine to operate as an electric motor for rotating the prime mover using current supplied by the battery and to operate the second electrical machine as an electrical generator, driven by the transmission unit, for supplying an electrical current to the battery.

According to another aspect of the invention for which protection is sought there is provided a method of controlling a hybrid electric vehicle, the method comprising, during braking of the vehicle: generating electrical energy from rotation of at least one wheel of the vehicle using an electric generator; storing the electrical energy in an energy storage device; and supplying electrical energy from the energy storage device and/or the electric generator to an electric motor and rotating an input shaft of an internal combustion engine of the vehicle using said electric motor so as to reduce a rate at which a state of charge of the energy storage device increases during braking.

The method may comprise the step of terminating a flow of fuel to the engine when the electric motor is rotating the engine during a regenerative braking operation.

The engine may be arranged to receive a supply of gas for burning the fuel and the method may comprise the step of terminating the supply of gas to the engine when the electric motor is rotating the engine during the regenerative braking operation.

The fuel burning engine may comprise an exhaust gas conduit and the method may comprise preventing exhaust gas flowing through the conduit when the electric motor is rotating the engine during the regenerative braking operation.

Within the scope of this application it is envisaged that each feature, aspect, embodiment, example and alternative set out in the preceding paragraphs, in the claims and/or in the following description and drawings may be taken independently or in any combination thereof. For example, features described with reference to one embodiment are applicable to other embodiments, unless there is incompatibility of features.

BRIEF DESCRIPTION OF THE DRAWINGS

Embodiments of the present invention will now be described, by way of example only, with reference to the accompanying figures in which.

DETAILED DESCRIPTION

Figure 1:
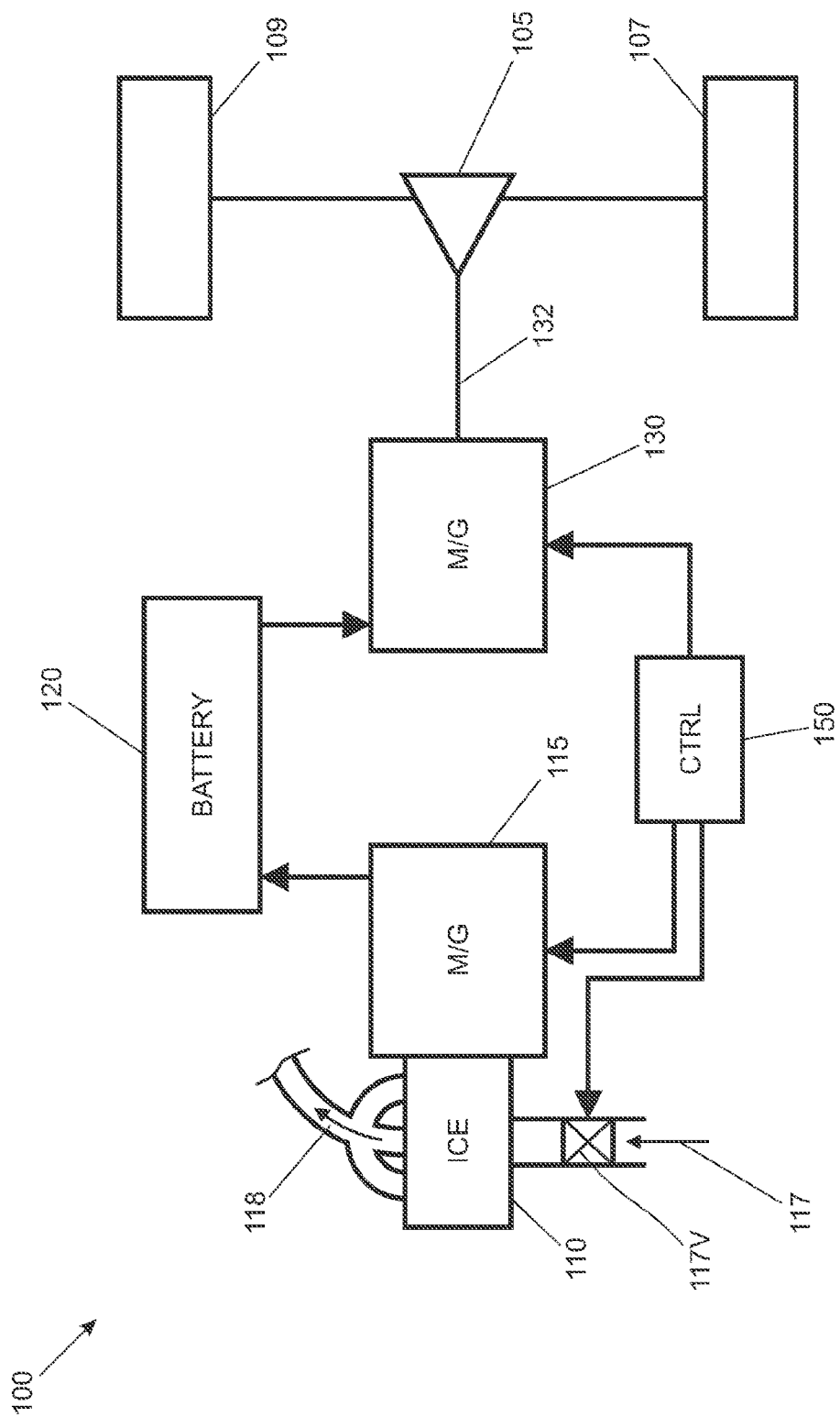
FIG. 1 is a schematic illustration of a hybrid electric vehicle embodying one form of the present invention.

FIG. 1 shows a series hybrid electric vehicle (HEV) 100 comprising an internal combustion engine 110 having an output shaft arranged to drive a first motor-generator 115. The engine 110 has an air intake conduit 117 and an exhaust gas conduit 118. The motor-generator 115 is operable to generate electrical current for charging a battery 120. In the embodiment shown the motor-generator 115 is a crankshaft integrated motor-generator (CIMG) 115. Other motor-generator arrangements are also useful such as a belt-integrated starter generator (BISG).

The CIMG 115 is also operable as an electric motor in order to turn the engine 110 when required. The battery 120 is operable to supply electrical current to the CIMG 115 when it is required to operate the CIMG 115 as a motor.

The battery 120 is also arranged to supply electrical current to a traction motor/generator 130. The traction motor/generator 130 is operable as an electric motor to supply motive power to drive a driveshaft 132 of the vehicle 100. The driveshaft 132 is arranged in turn to drive a pair of road wheels 107, 109 via a differential 105.

The traction motor/generator 130 is also operable as an electrical generator driven by the road wheels 107, 109. When a driver of the vehicle depresses a brake pedal of the vehicle, a controller 150 is arranged to control the traction motor/generator 130 to act as a generator. Thus, the rotating road wheels 107, 109 cause a rotor of the traction motor/generator 130 to turn causing a reverse electromotive force (EMF) to be generated in a stator of the motor/generator 130. This reverse EMF applies a retarding torque to the driveshaft 132, slowing the vehicle. The reverse EMF also generates a current which is used to recharge the battery 120 of the vehicle 100. In some embodiments the traction motor/generator 130 may be operated as a generator to apply a retarding force to slow the vehicle 100 when an accelerator pedal is released. The amount of the retarding force may be increased if the brake pedal is subsequently depressed.

The above process of generating electrical current and causing braking of the vehicle 100 is commonly referred to as 'regenerative braking'. An event in which the regenerative braking process is performed will be referred to herein as a regenerative braking event.

It is to be understood that regenerative braking allows energy that would otherwise be dissipated as heat by friction brakes of the vehicle 100 to be converted to useful energy in the form of stored electrical charge.

The controller 150 is arranged to monitor a state of charge (SoC) of the battery 120. If the SoC exceeds a prescribed threshold value and a regenerative braking event occurs in which the traction motor/generator generates electrical power, the controller 150 is arranged to terminate a supply of fuel to the engine 110 (if this has not already occurred) and to control the CIMG 115 to act as a motor to rotate the crankshaft of the engine 110.

Thus, electrical current from the battery 120 (or traction motor/generator 130) is dissipated by the CIMG 115 in cranking the engine 110. Cranking of the engine 110 may also be referred to as motoring the engine 110.

It is to be understood that if the SoC of the battery 120 exceeds the prescribed threshold the controller 150 prevents further charging of the battery 120 in order to avoid damage to the battery 120. This has the effect in known HEVs that a regenerative braking event cannot be performed. This is because there is no flow path from the traction motor/generator 130 for current generated by the traction motor/generator 130 during a regenerative braking event. Thus substantially no reverse EMF can be generated by the traction motor/generator 130 and therefore no retarding torque can be applied to the driveshaft 132.

In order to overcome this problem, in the present embodiment when a regenerative braking event takes place and the battery SoC is above a threshold level the traction motor/generator 130 (which normally operates as an electric motor) is controlled to operate as a generator and the CIMG 115 (which normally operates as a generator) is controlled to operate as a motor.

Embodiments of the invention have the advantage that regenerative braking may still be effected by a vehicle even when the battery SoC is such that the battery 120 is unable to accept further charge. This allows the behavior of the vehicle 100 when the accelerator is released and brake pedal depressed to remain consistent regardless of the SoC of the battery 120. That is, a relative proportion of regenerative and friction braking employed by a vehicle during a braking operation may remain substantially the same regardless of a state of charge of a battery.

It is to be understood that a situation in which the CMIG 115 is controlled to operate as a motor during a regenerative braking event may be relatively rare. One example of a situation in which regenerative braking might occur when the SoC of the battery 120 is high is when the vehicle is travelling at a steady and relatively high speed. Sudden application of the brakes to slow the car using regenerative braking could generate a sufficiently large amount of electrical charge that the battery would be unable to accept the charge. At least some of this charge may therefore be used to drive the CIMG 115 as an electric motor with the supply of fuel to the engine 110 terminated.

It is to be understood that when acting as an electrical generator the CIMG 115 may in some embodiments generate around 35 kW of electrical energy to charge the battery 120 and power the traction motor/generator 130 as a motor. In a regenerative braking situation the traction motor/generator 130 may generate around 10 kW of power for a relatively short period of time. The battery 120 may be unable to accept the 35 kW of power generated by the CIMG 115 and the 10 kW of power generated by the traction motor/generator 130 (45 kW in total) if its SoC is high.

By switching off the engine 110, the amount of electrical power being developed to charge the battery 120 is reduced from 45 kW to 10 kW and fuel is saved because a supply of fuel to the engine 110 is switched off (or at least substantially reduced, in some embodiments). Furthermore, if the CIMG 115 is now operated as an electric motor to crank the engine 110 around 2 kW of electrical power may be dissipated by the CIMG 115 leaving a total of 8 kW of power from the regenerative braking operation for the battery 120 to absorb. The vehicle 100 may be arranged to control the battery to accept this charge. In some embodiments this may result in the total SoC of the battery 120 exceeding temporarily a recommended maximum SoC (such as the prescribed level discussed above) in order to maintain consistent performance of the vehicle 100 during the regenerative braking process. This has the advantage that the vehicle 100 performs substantially in the manner expected by the driver during a regenerative braking event regardless of the SoC of the battery 120.

It is to be understood that wear of the friction brakes may also be reduced since a likelihood that use of the friction brakes will be required is reduced.

In some embodiments the vehicle is configured to drive the CIMG 115 to turn the engine 110 during the regenerative braking event until the amount of current generated by the traction motor/generator 130 falls below a prescribed threshold. The controller 150 may then be arranged to restore a supply of fuel to the engine 110 to restart the engine 110. Alternatively the controller 150 may be arranged to terminate rotation of the engine 110 by the CIMG 115 and not to restore the supply of fuel to the engine 110 so that the engine assumes a stationary condition.

The action taken by the controller 150 may depend on whether the driver applies pressure to the accelerator following the regenerative braking event or allows the vehicle to slow to a standstill. Other arrangements are also useful.

It is to be understood that although energy developed by the regenerative braking process is dissipated in cranking the engine 110 in the circumstances described above, because a supply of fuel to the engine 110 is terminated the amount of fuel consumed by the engine 110 is reduced thereby reducing the amount of carbon dioxide emitted by the vehicle 100.

In the embodiment of FIG. 1 the controller 150 is also configured to control operation of an engine air intake throttle valve 117V provided in the engine air intake conduit 117. The valve 117 is employed by an engine control unit to control an amount of air drawn into the engine 110 when the engine 110 is running under its own power. In the present embodiment, the controller 150 controls the valve 117 to determine an amount by which flow of air into the engine 110 is restricted when the engine is motored by the CIMG 115.

If the amount of energy developed by the motor/generator 130 in a regenerative braking operation exceeds that which may be received by the battery 120, the controller 150 closes the throttle valve by a prescribed amount in order to increase an amount of work that must be done by the CIMG 115 in motoring the engine 110 at a given speed. In some embodiments the amount by which the valve is closed is determined responsive to an amount of excess current developed in a regenerative braking operation that must be dissipated.

It is to be understood that in a typical internal combustion engine of relatively small size, an amount of power that may be dissipated by the engine 110 when airflow through the engine 110 is restricted and the engine 110 is motored may be increased from around 2 kW to around 10 kW or more, depending on a size of the engine 110. Thus, in the example given above where the excess power developed was around 10 kW, substantially the entire amount of the excess power may be dissipated by the CIMG 115 when motoring the engine 110 by restricting a flow of air through the engine 110. The battery 120 would therefore be substantially entirely relieved of a requirement to accept regenerated power.

Figure 2:
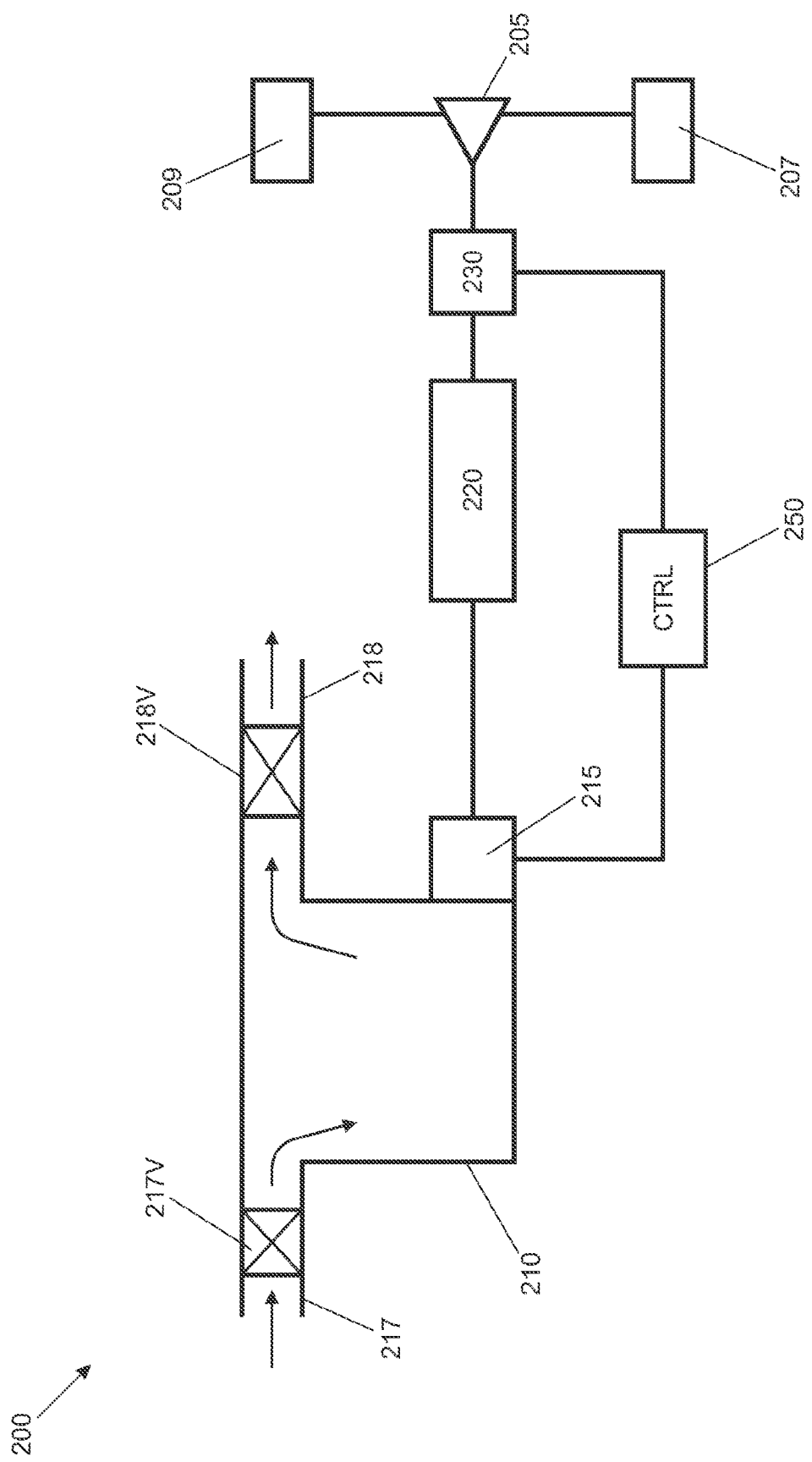
FIG. 2 is a schematic illustration of a hybrid electric vehicle embodying another form of the present invention.

FIG. 2 shows an engine 210 of a vehicle 200 according to a further embodiment of the invention similar to that of the embodiment of FIG. 1. Like features of the embodiment of FIG. 2 to that of FIG. 1 are provided with like reference signs prefixed numeral 2 instead of numeral 1.

The engine 210 is coupled to a CIMG 215 arranged to charge a battery 220 under the control of a controller 250.

The engine 210 has an air intake conduit 217 and an exhaust gas conduit 218. In the embodiment shown an inlet valve 217V is provided in the air intake conduit 217 and an outlet valve 218V is provided in the exhaust gas conduit 218. The valves 217V, 218V are operable to prevent flow of gas therepast when required.

When it is required to dump electrical charge from the battery 220 of the vehicle into the CIMG 215 to rotate a crankshaft of the engine 210, for example during a regenerative braking event when the SoC of the battery 220 exceeds a predetermined threshold level, as described above, the controller 250 is arranged to close one or both of the inlet valve 217V and outlet valve 218V.

In some embodiments only one of the valves 217V, 218V is provided as in the embodiment of FIG. 1.

It is to be understood that if inlet valve 217V is closed and the engine 210 is cranked (or motored) by the CIMG 215 a gas pressure immediately downstream of the valve 217V will fall below the value of gas pressure present in that region with the valve 217V open.

Similarly if the outlet valve 218V is closed and the engine 210 is motored by the CIMG 215 a gas pressure immediately upstream of the valve 218V will rise above the value of gas pressure present in that region with the valve 218V open.

It is to be understood that closure of either or both of the valves 217V, 218V has the effect that a greater amount of torque is required to be provided by the CIMG 215 in order to motor the engine 110. Therefore a greater amount of electrical power is dissipated by the CIMG 215 under these circumstances. Thus the CIMG 215 is able to provide further relief to the battery 220 in respect of the amount of charge the battery 220 is required to store for a given amount of charge (or power) generated by the traction motor/generator 230 during a regenerative braking event.

Embodiments of the invention have the advantage that regenerative braking may be performed even under circumstances where a battery SoC is such that regenerative braking would be impossible for or prohibited by known vehicle systems. This in turn allows a performance of a vehicle to remain consistent even under conditions of high SoC of the battery. Furthermore, embodiments of the invention allow a reduction in fuel consumption of a vehicle since a supply of fuel to an engine may be terminated when a regenerative braking event occurs. However, because the CIMG continues to turn the engine, the engine may be more quickly restarted if a supply of fuel to the engine is resumed. It is to be understood that in fuel burning actuators requiring spark ignition of fuel, a controller may be arranged to suspend provision of spark ignition in addition to or instead of terminating a supply of fuel. Other arrangements are also useful.

It is to be understood that the controller 150, 250 of the embodiments of FIG. 1 and FIG. 2 may be arranged to monitor an amount of electrical power developed by the traction motor/generator 130, 230 by communicating with a controller associated with the motor/generator such as an inverter arranged to convert DC current to AC current and vice versa.

In some embodiments the controller is 150, 250 is arranged to communicate with a brake controller such as an anti-lock brake system (ABS) controller. The controller 150, 250 may provide an indication to the brake controller of the amount of regenerated power the battery 120, 220 or CIMG 115, 215 is able to dissipate, allowing the brake controller to determine a required brake torque split between a regenerative braking system and a foundation braking system (typically a friction braking system). It is to be understood that in normal operations the brake controller may attempt to control the vehicle to provide braking in which regenerative braking and foundation braking systems are both used to provide brake torque unless the required brake torque is particularly low in which case only regenerative (or only foundation) braking may be employed.

Embodiments of the invention have the advantage that because the CIMG 115, 215 is able to dissipate a substantial amount of regenerated electrical power when the battery 120, 220 is unable to receive the power, the brake controller is able consistently to operate according to an optimum brake torque split between regenerative and foundation brake systems regardless of a state of charge (or operational availability) of the battery. This has the advantage that a driver experience when applying brakes of the vehicle is substantially consistent regardless of battery condition.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith.

I claim:

1. An apparatus comprising:
    a fuel burning actuator;
    a generator configured to be driven by the actuator and arranged to generate charge to recharge an energy storage device;
    a first electric machine operable to motor the actuator so as to cause the actuator to pump a fluid;
    a second electric machine operable to generate charge in a regenerative braking operation in order to recharge the energy storage device;
    wherein the apparatus is configured automatically to motor the actuator by means of the first electric machine when the actuator is not burning fuel in dependence on at least one operating parameter associated with the energy storage device, the apparatus being operable automatically to restrict by a restrictor device an amount of fluid pumped by the actuator by restricting an amount of fluid flowing out from the fuel burning actuator thereby to increase an amount of work done by the first electric machine when the actuator is motored,
    and wherein the apparatus is operable to control the restrictor device to increase an amount of work done by the first electric machine by restricting the amount of fluid flowing out from the fuel burning actuator, when the fuel burning actuator is motored, by an amount dependent on the value of at least one operating parameter associated with the energy storage device.

2. An apparatus as claimed in claim 1 wherein the fluid is a gas.

3. An apparatus as claimed in claim 1 operable automatically to restrict the amount of fluid pumped by the fuel burning actuator by restricting an amount of intake gas flowing into the fuel burning actuator.

4. An apparatus as claimed in any claim 1 wherein the restrictor device comprises a valve.

5. An apparatus as claimed in claim 1 wherein the at least one operating parameter of the energy storage device is one of a state of charge, a temperature and a present value of a maximum allowable charge rate.

6. An apparatus as claimed in claim 1 wherein the first electric machine is operable as the generator driven by the fuel burning actuator and as a motor for motoring the fuel burning actuator.

7. An apparatus as claimed in claim 6 wherein the first electric machine comprises one of a crank-integrated starter-generator (CISG) and a belt-integrated starter-generator (BISG) of an engine.

8. An apparatus as claimed in claim 1 wherein the second electric machine is also operable as a traction motor.

9. An apparatus as claimed in claim 1 wherein the fuel burning actuator comprises one of an internal combustion engine and a gas turbine engine.

10. An apparatus as claimed in claim 1 operable to terminate a flow of fuel to the fuel burning actuator when the first electric machine is motoring the engine during a regenerative braking operation.

11. A hybrid electric motor vehicle, a hybrid electric locomotive or a marine vessel comprising an apparatus as claimed in claim 1.

12. A method comprising:
    generating charge to recharge an energy storage device by means of a generator driven by a fuel burning actuator;
    performing a regenerative braking operation to recharge the energy storage device;
    when said regenerative braking operation is performed, automatically motoring the fuel burning actuator in dependence on at least one operating parameter associated with the energy storage device;
    restricting an amount of fluid pumped by the fuel burning actuator when the fuel burning actuator is motored thereby to increase an amount of work done when the fuel burning actuator is motored;
    automatically restricting the amount of fluid pumped by the fuel burning actuator by using a restrictor device for restricting an amount of fluid flowing out from the fuel burning actuator; and
    controlling the restrictor device to increase an amount of work done by the first electric machine by restricting the amount of fluid flowing out from the fuel burning actuator, when the fuel burning actuator is motored, by an amount dependent on the value of at least one operating parameter associated with the energy storage device.

* * * * *